No. 725,267. PATENTED APR. 14, 1903.
E. C. MILLER.
ATTACHMENT FOR DRILL WRENCHES.
APPLICATION FILED APR. 17, 1902.
NO MODEL.
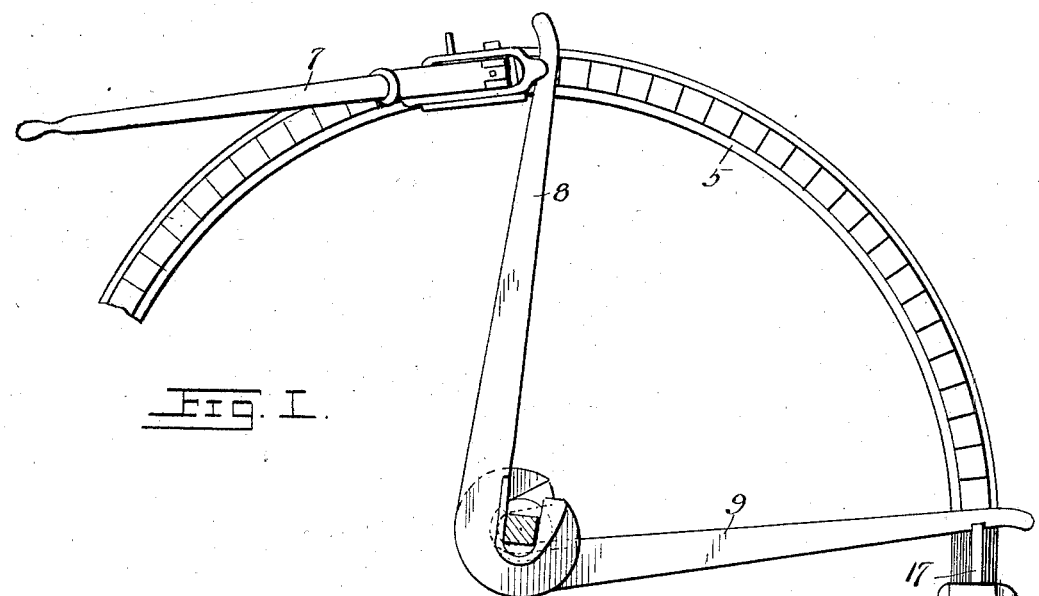
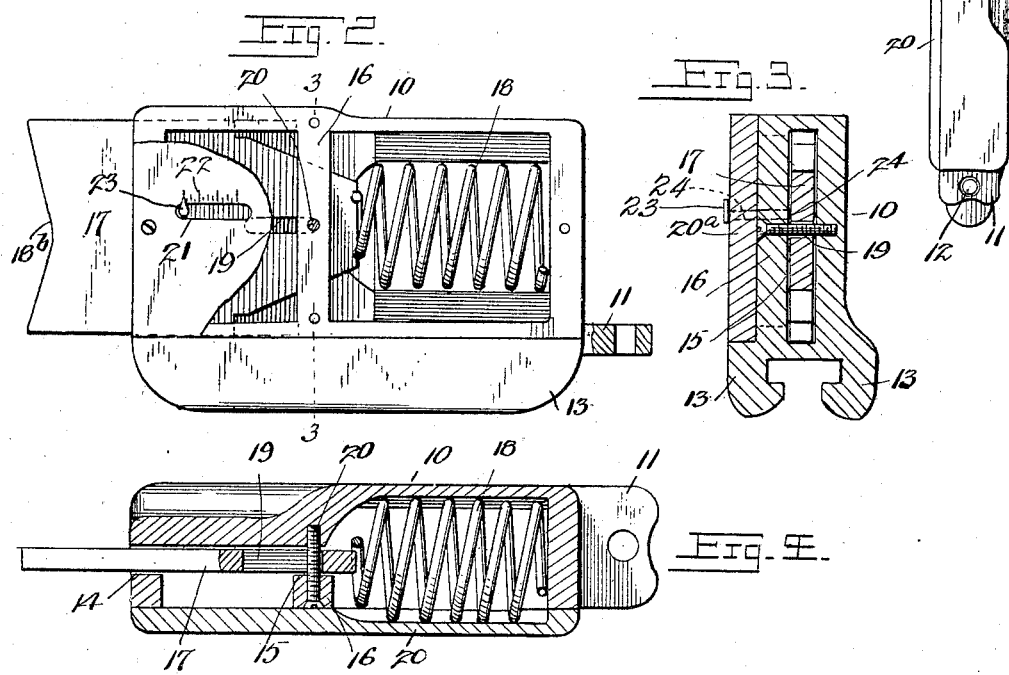
Witnesses
F. E. Alden.
Scott Chandlee.
E. C. Miller, Inventor
by C. A. Snow & Co.
Attorneys

UNITED STATES PATENT OFFICE.

EDWIN CLARENCE MILLER, OF LAHARPE, KANSAS.

ATTACHMENT FOR DRILL-WRENCHES.

SPECIFICATION forming part of Letters Patent No. 725,267, dated April 14, 1903.

Application filed April 17, 1902. Serial No. 103,405. (No model.)

*To all whom it may concern:*

Be it known that I, EDWIN CLARENCE MILLER, a citizen of the United States, residing at Laharpe, in the county of Allen and State of Kansas, have invented a new and useful Attachment for Drill-Wrenches, of which the following is a specification.

This invention relates to wrenches for oil-well tools such as employed in screwing and unscrewing the drill-sections; and it has for its object to provide a device for use in connection with a construction of wrench such as shown in patent to W. Forgie, numbered 422,879, for determining the pressure applied in screwing the sections together, so that a joint of sufficient tightness will be insured and disjointing of the drill-sections when in operation will be prevented.

In the drawings forming a portion of this specification, and in which like numerals of reference indicate similar parts in the several views, Figure 1 is a top plan view of a wrench such as shown in the patent to Forgie, above mentioned, and having the present pressure recording or indicating device attached thereto. Fig. 2 is a side elevation of the indicator with its side plate partly removed to show the interior mechanism. Fig. 3 is a section on line 3 3 of Fig. 2. Fig. 4 is a longitudinal horizontal section of the indicator.

Referring now to the drawings, there is shown a wrench including a rack 5, which is arcuate and which is disposed concentric with the drill-rod that is to be uncoupled, and on the rack is disposed a slidable carriage provided with a feed mechanism, including the lever 7 for urging it along over the rack, and engaged with one end of the carriage is the outer end of one of the wrench-bars 8, which at its opposite end is fashioned to engage an angular portion of a member of the drill-rod in the usual manner. Engaged with the section of the rod or with the drill below the first bar 8 is the gripping end of a second bar 9, the opposite end of which is projected radially of the rack and across the rack for engagement with the indicator, so that when the carriage is operated to screw up the joint in the usual manner the bar 9 will be pressed against the indicator, which will be operated to show the pressure applied. The indicator consists of a casing 10, at one end of which is a foot 11, and this casing is disposed upon the rack, and the foot is perforated to receive the pin 12 at the end of the rack to hold the casing against movement longitudinally of the rack. The rack is of T shape, and on the bottom of the casing are downwardly and inwardly directed flanges 13, which engage around the flanges of the rack, so that the casing may be slidably engaged with the end of the rack and will be held against upward displacement. In the forward end of the casing 10 is a slot or opening 14, alining with which is a guideway 15 within the casing, formed by the transverse web 16, and passed through the slot and the guideway is a sliding plate 17, the inner end of which is disposed against the end of a helical spring 18 in the rear end of the casing, while the forward end of the plate projects from the forward end of the casing and is concaved, as shown at $18^b$, to receive the end of the wrench-bar 9. In the plate 17 is a longitudinal slot 19, and through this slot is passed a screw 20, engaged with the web 16 and with the casing in the rear of the plate, and this screw limits the sliding movement of the plate in both directions. In the side plate $20^a$ of the casing 10 is a slot 21, extending longitudinally thereof, and at one side of the slot the side plate is marked with a scale 22, which is traversed by the index 23 at the outer end of a stud 24, passed through the slot of the plate $20^a$ and engaged with the plate 17. The index stands normally at the outer end of the scale; but in the operation of the device as the pressure of the bar 9 is applied to the plate 17 the latter moves into the casing, and by properly graduating the scale the amount of pressure applied may be accurately determined. Couplings of different diameters require different degrees of pressure to engage them securely, and with this indicating attachment it may be readily seen when the proper amount of pressure has been applied.

The apparatus as described may also be used to measure the resistance in unscrewing a joint to avoid applying excessive pressure.

What is claimed is—

1. An indicating attachment for drill-wrenches, comprising in combination with the bars constituting the wrench, a casing having a plate slidably disposed therein and having a recessed end projecting from said casing to receive a wrench-bar, means for holding the plate yieldably against movement, an index carried by the plate, a scale upon the casing in operative relation to the plate, and means for operating the other wrench-bar.

2. An indicating attachment for drill-wrenches, comprising in combination with the bars constituting the wrench, a casing having a slotted end and provided with means for attachment to the segment-rack of the wrench, a plate slidably disposed in the slot of the casing and having a recessed outer end to receive one of the wrench-bars, said casing having a slot in its side, a stud connected with the plate and extending through the slot in the side of the casing, an index carried by the stud, a scale marked upon the casing adjacent to the index and means for operating the other wrench-bar.

3. A pressure-indicating attachment for drill-wrenches comprising a casing provided at its base with inwardly-directed flanges to engage a wrench-rack and with a foot adapted to receive a securing-pin, a slide arranged within said casing and having a projecting end to engage one of the wrench-bars, a yieldable support for the inner end of said plate, an index carried by said plate and projecting through a slot in the casing, and a scale upon the casing adjacent to said slot, substantially as set forth.

4. In a device of the class described, the combination of a casing having an opening at its front end and a guideway formed by a transverse web within the casing, a slide extending through the opening at the front end of the casing and through the guideway in the latter, a screw extending through the web forming the guideway and through a longitudinal slot in the sliding plate and into the opposite wall of the casing, a spring disposed in the rear end of the latter and bearing against the inner end of the sliding plate, and an index carried by the latter, extending through a slot in the casing and coöperating with a scale upon the outside of the casing to indicate the amount of pressure exerted against the tension of the spring, substantially as set forth.

In testimony that I claim the foregoing as my own I have hereto affixed my signature in the presence of two witnesses.

EDWIN CLARENCE MILLER.

Witnesses:
  GEO. G. FOX,
  FRANK WOOD.